Patented Jan. 2, 1940

2,185,854

UNITED STATES PATENT OFFICE 2,185,854

PRODUCTION OF BENZYLIDENE-ANILINE COMPOUNDS

Frederick H. Kranz, Buffalo, N. Y., assignor to National Aniline and Chemical Company, Inc., New York, N. Y., a corporation of New York No Drawing. Application March 1, 1938,
Serial No. 193,263

15 Claims. (Cl. 260—566)

This invention relates to the preparation of N-alkyl-amino-benzaldehyde compounds and particularly to the reaction of N-dialkyl-amino-nitroso-benzenes, formaldehyde, and N-alkyl-amino-benzene compounds to form the intermediate benzylidene-aniline or benzaldehyde-anil compounds which by hydrolysis with a weak acid in the presence of another reactive aldehyde may be readily converted to the para-N-alkyl-amino-benzaldehyde compounds.

In the past it has been proposed to react the N-alkyl-amino-benzenes, for instance N-dimethyl-aniline, with nitrous acid to form para-nitroso-dimethyl-aniline and then to isolate this product and add it to a hot mixture of formaldehyde and dimethyl-aniline (hydrochloride) to form the benzylidene-aniline compound, in accordance with the reaction:

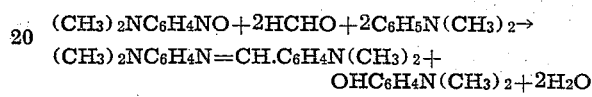

(CH$_3$)$_2$NC$_6$H$_4$N=CH.C$_6$H$_4$N(CH$_3$)$_2$+
OHC$_6$H$_4$N(CH$_3$)$_2$+2H$_2$O

The benzylidene-aniline compound by reaction with water in the presence of a weak acid and another aldehyde is then broken into para-N-dimethyl-amino-benzaldehyde and a Schiff's base, which, if formaldehyde is used, is N-dimethyl-N'-methylene-1,4-phenylene-diamine.

However, in conducting the above process for the manufacture of the benzylidene-aniline compounds, I have found that the heating of the alkylaniline with formaldehyde results in the formation of an appreciable quantity of condensation products, for example, N-alkylated diamino-diphenyl-methane compounds, which do not react as desired with the subsequently added nitroso-compound and hence correspondingly reduce the ultimate yield of the desired benzaldehyde derivatives.

Furthermore, by adding the nitroso compound to a hot mixture of formaldehyde and N-alkyl-amino-benzene (hydrochloride), as previously proposed, a violent reaction occurs which is exceedingly difficult to control and makes the maintenance of optimum temperature in commercial operations dependent upon special apparatus capable of quickly dissipating the heat of reaction and preventing excessive temperature rise. Unless special precautions are taken, the high temperature occurring, at least locally, results in decomposition and consequent reduced yield of desired products. If, on the other hand, the N-alkyl-amino-benzene and the N-alkyl-amino-para-nitroso-benzene are first mixed and the formaldehyde is subsequently added, the N-alkyl-amino-benzene and the nitroso-benzene compound react to form tarry by-products in a still greater degree; consequently satisfactory products are not obtainable by this method without undesirably low yields.

I have found that by inhibiting reaction of any two of the components before they are admixed with the third component and by causing the three components to react at the temperature required to form the benzylidene-aniline compound, the production of by-products is greatly decreased and high yields of the benzaldehyde compound may be obtained without contamination by substantial quantities of tarry materials. Moreover, I have found that the benzylidene-aniline reaction product is comparatively little affected by the temperatures required for the reaction.

Thus, in accordance with the present invention at least the formaldehyde and the nitroso-compound are added in a cool condition to the hot reaction zone; for instance, all three reactants can be introduced in proper proportions separately or as a cool mixture into the hot reaction zone; or the N-alkyl-amino-benzene compound, either hot or cold, can be introduced into the reaction zone ahead of the other two cool reactants, which can be added in the proper proportions, separately or as a mixture. The reactants may be added gradually to hot aqueous reaction product. Upon commencing the reaction, a body of hot water may be employed as the reaction medium or a solution of the alkyl-amino-benzene compound may be heated to reaction temperature and employed for this purpose. Whether the formaldehyde and the nitroso-compound are added individually or together to the hot N-alkyl-amino-benzene compound, they should be added cold, preferably below 30° C.

Since it is difficult to maintain a constant flow of the three reactants individually into the reaction zone in the proper proportions, I prefer first to mix the nitroso-compound and formaldehyde solution at a temperature below about 20° C. (normally a temperature of about 0° C. is satisfactory and conveniently obtained) and to add this mixture gradually to the reaction zone already containing the N-alkyl-amino-benzene compound at a temperature between 60° and 100° C. As the reaction proceeds, the temperature may be accurately controlled by regulating the addition of the slurry of nitroso-compound in formaldehyde solution so that the heat of reaction will just compensate for the dissipation of heat to the surrounding atmosphere and the absorption of heat by the added solution.

In the conduct of my process I have further found that it is unnecessary to isolate the nitroso-compound after its production and that the reaction mixture obtained by the treatment of an N-dialkyl-aniline in hydrochloric acid solution with sodium nitrite may be employed directly; that is, the formaldehyde may be mixed with the cold resultant slurry without any separation of the suspended nitroso-N-dialkyl-aniline-hydrochloride from the aqueous acid liquor, and the mixture may then be added to the hot N-dialkyl-aniline solution.

The process of my invention is applicable to N-mono- and N-di-alkyl-anilines and their substitution products whose substituent groups are not in para position to the N-alkyl-amino groups and are not undesirably reactive under the conditions of treatment. Thus the process is applicable to the production of para-N-dimethyl-amino-benzaldehyde, para-N-diethyl-amino-benzaldehyde, 1-(N-diethyl-amino)-3-ethoxy-4-benzaldehyde, and other substituted mono- or di-N-alkyl-amino-benzaldehydes.

The following example of the manufacture of para-N-diethyl-amino-benzaldehyde illustrates the preferred manner in which my invention may be carried out. Relative proportions are expressed in parts by weight.

*Example.*—150 parts water, 325 parts 20° Bé. hydrochloric acid (about 31% HCl) and 163 parts N-dimethyl-aniline are charged to a suitable vessel, provided with refrigeration means, and cooled to 0° C. The cold mixture is rapidly agitated while maintained at a temperature between 0° and 5° C. and 246 parts of a sodium nitrite solution, prepared by dissolving 96 parts NaNO₂ in 150 parts cold water, are added slowly as a stream over a period of about 4½ hours. As a result of this treatment a thick suspension of para-nitroso-N-dimethyl-aniline hydrochloride crystals in an acid aqueous liquor is obtained. The mixture is stirred for several hours at the designated low temperature to complete the reaction. At this point a very slight excess of nitrous acid should be present in the aqueous phase. To the reaction mixture 171.5 parts of aqueous formaldehyde solution containing 37.5% HCHO are added, the temperature of the mixture being maintained at about 0° C.

In a separate reaction vessel 298 parts of N-diethyl-aniline, 450 parts water, and 520 parts 20° Bé. hydrochloric acid are mixed and heated to about 95° C. The heating of this mixture should be started sufficiently soon so that the desired temperature will be attained within about 30 minutes, preferably within 15 minutes, of the formation of the formaldehyde, nitroso-compound mixture.

The hot N-diethyl-aniline (hydrochloride) solution is rapidly agitated and the nitroso-dimethyl-aniline and formaldehyde mixture is added gradually thereto. After commencement of reaction, no additional heating is required and the temperature may be controlled by the rate of addition of the nitroso-compound, formaldehyde mixture on the one hand and ordinary dissipation of heat on the other. Thus, for a 400 pound batch of diethyl-amino-benzaldehyde suitable temperatures may be maintained by addition of the nitroso-compound, formaldehyde mixture in a period of about 10 minutes. If desired, further temperature control may be obtained by the addition of ice. When the addition of the mixture is complete, stirring is continued for about 5 to about 10 minutes to effect reaction of the last of the reactants and the mixture is then cooled to about 50° C. by adding ice. The use of ice as a cooling medium at this point has the advantage of effecting rapid cooling so that decomposition of the addition compound is minimized.

The solution is then made slightly alkaline to Brilliant Yellow by addition of about 520 parts of caustic soda (50% NaOH) solution while its temperature is maintained at 50° plus or minus 5° C. The mixture is then allowed to settle. A red-brown oil 1-diethyl-amino-4-benzylidene-1'-dimethyl-amino-4'-aniline rises to the top of the aqueous liquid and the latter is drawn off therefrom.

To the oil fraction 450 parts of glacial acetic acid and 134 parts of cold aqueous 37.5% formaldehyde solution are added. To convert the 1-diethyl-amino-4-benzylidene-1'-dimethyl-amino-4'-aniline into N-dimethyl-N'-methylene-paraphenylenediamine and para-N-diethyl-amino-benzaldehyde, the resultant mixture is agitated at a temperature between 25° C. and 30° C. for about five hours and then cooled by addition of ice. The cold mass is diluted by gradual addition of water over a period of about one hour until the total volume is equal to that of about 4000 parts by weight of water. During this dilution the temperature should be maintained below 10° C. The mixture is stirred until substantially all of the para-N-diethyl-amino-benzaldehyde has crystallized out (from 5 to 20 hours). The crystals are separated from mother liquid by filtration and washed with cold water until the washes are colorless and neutral to Brom-Cresol Green, i. e., have a pH between 4 and 6.

The washed crystals are dried in air, warmed to about 60° C., and melted. A brown heavy oil layer forms beneath an aqueous layer. The heavy oil is separated from the water and distilled at a pressure below about 25 mm. of mercury. Operating at about 10 mm. mercury absolute pressure, the distillate which is obtained between 170° and 172° C. is collected. By conducting the process as above described, a yield of about 250 parts para-N-diethyl-amino-benzaldehyde having a setting point of about 38.8° C., corresponding to about 70% of the theoretical yield, is obtained.

In the foregoing example, acetic acid can be replaced by other weak acids such as propionic acid, axolic acids, malic acid, etc. In the second step the purpose of the formaldehyde is to form a Schiff's base with the para-amino-N-dimethyl-aniline as soon as the latter is released during hydrolysis. For this purpose the lower aliphatic aldehydes such as formaldehyde, acetaldehyde, propionaldehyde, furfuraldehyde, etc., are well suited, since they form Schiff's bases which are not hydrolyzed as readily as those derived from aromatic aldehydes.

My invention lends itself to continuous as well as batch operations. Thus the nitroso-compound and formaldehyde may be added, at several points, to a flowing stream of the N-dialkyl-amino-benzene hydrochloride in aqueous solution maintained at the desired temperature. In such operations it may be advantageous to start the stream with only a part of the N-dialkyl-amino-benzene-hydrochloride hot, and to add the balance cold at points along the flow to absorb the heat of reaction. Instead of gravity separators continuous centrifuges may be used for effecting the separations. Such operations have the advantage over batch operations of minimizing the time during which the intermediate is subjected to elevated temperature so that high yields and a purer product may be obtained. On the other hand such operations require the use of more expensive equipment and more careful and accurate control, which may not be justified for small or intermittent production.

The procedure involving admixture of all three reactants cold and addition of the resultant mixture to the hot reaction zone or product also is advantageous for continuous operations. The mixture may be continuously added to a body of the hot reaction product in a state of vigorous agitation and the product may be continuously withdrawn therefrom, the temperature of the mixture withdrawn being maintained, if desired, for a period of five minutes or so to complete the reaction before the product is cooled and neutralized. Temperature in the reaction zone may be controlled by external cooling means or by adding ice or "dry ice", i. e., solid carbon dioxide, or by correlating the temperature of ingoing mixture and the quantity of water therein so that the heat of reaction is only about sufficient to supply the sensible heat of the reacting mixture at reaction temperature.

I claim:

1. In the reaction of formaldehyde with a para-N-alkyl-amino-nitroso-benzene compound and an N-alkyl-amino-benzene compound free from para-substituents to form the corresponding benzylidene-aniline, the improvement which comprises adding at least the nitroso-compound and formaldehyde at a temperature below reaction temperature to the hot reaction zone wherein reaction of the three reactants is effected.

2. In the reaction of formaldehyde with a para-N-alkyl-amino-nitroso-benzene compound and an N-alkyl-amino-benzene compound free from para-substituents to form the corresponding benzylidene-aniline, the improvement which comprises adding at least the nitroso-compound and formaldehyde at a temperature below reaction temperature to a hot solution containing the benzylidene-aniline.

3. In the reaction of formaldehyde with a para-N-alkyl-amino-nitroso-benzene compound and an N-alkyl-amino-benzene compound free from para-substituents to form the corresponding benzylidene-aniline, the improvement which comprises adding the cold nitroso-compound and formaldehyde to a hot aqueous solution containing the N-alkyl-amino-benzene compound.

4. In the reaction of formaldehyde with a para-N-alkyl-amino-nitroso-benzene compound and an N-alkyl-amino-benzene compound free from para-substituents to form the corresponding benzylidine-aniline, the improvement which comprises adding the cold nitroso-compound and formaldehyde to a hot solution containing the benzylidene-aniline and the hydrochloride of the N-alkyl-amino-benzene compound.

5. In the reaction of formaldehyde with a para-N-alkyl-amino-nitroso-benzene compound and an N-alkyl-amino-benzene free from para-substituents to form the corresponding benzylidene-aniline, the improvement which comprises gradually adding at least the nitroso-compound and formaldehyde at a temperature below 30° C. to an aqueous solution containing the benzylidene-aniline maintained at a temperature between 60° C. and 100° C.

6. In the preparation of a benzylidene aniline from an N-alkyl-amino-benzene free from para-substituents, the improvement which comprises nitrosating an N-dialkyl-amino-benzene, adding formaldehyde to the cold reaction mass, and adding the resultant cold mixture to hot N-alkyl-amino-benzene free from para-substituents to form the corresponding benzylidene-aniline.

7. In the reaction of formaldehyde with para-N-dimethyl-amino-nitroso-benzene and N-di-ethyl-aniline to form the corresponding benzylidene-aniline, the improvement which comprises gradually adding a cold mixture of the para-nitroso-N-dimethyl-aniline and formaldehyde to a hot aqueous solution of the N-diethyl-aniline hydrochloride.

8. In the preparation of a benzylidene aniline from N-diethyl-aniline, the improvement which comprises nitrosating N-dimethyl-aniline, adding formaldehyde to the cold reaction mass, and adding the resultant cold mixture to a hot solution of N-diethyl-aniline hydrochloride to form the corresponding benzylidene-aniline.

9. In the preparation of a benzylidene aniline from N-diethyl-aniline, the improvement which comprises nitrosating N-dimethyl-aniline, adding formaldehyde to the cold reaction mass, and adding the resultant cold mixture to a solution of N-diethyl-aniline hydrochloride maintained at a temperature between 60° and 100° C. to form the corresponding benzylidene-aniline.

10. In the preparation of a benzylidene aniline from N-dimethyl-aniline, the improvement which comprises nitrosating N-dimethyl-aniline, adding formaldehyde to the cold reaction mass, and adding the resultant cold mixture to a solution of N-dimethyl-aniline hydrochloride maintained at a temperature between 60° and 100° C. to form the corresponding benzylidene-aniline.

11. In the preparation of a benzylidene aniline from N-dimethyl-aniline, the improvement which comprises nitrosating N-dimethyl-aniline, adding formaldehyde to the cold reaction mass, and adding the resultant mixture at a temperature below 30° C. to a solution of N-dimethyl-aniline hydrochloride maintained at a temperature between 60° and 100° C. to form the corresponding benzylidene-aniline.

12. In the reaction of formaldehyde with a para-N-lower-alkyl-amino-nitroso-benzene and an N-lower-alkyl-amino-benzene to form the corresponding benzylidene-aniline, the improvement which comprises adding at least the nitroso compound and formaldehyde at a temperature below reaction temperature to the hot reaction zone wherein reaction of the three reactants is effected.

13. In the reaction of formaldehyde with a para-N-lower-alkyl-amino-nitroso-benzene and an N-lower-alkyl-amino-benzene to form the corresponding benzylidene-aniline, the improvement which comprises adding the cold nitroso compound and formaldehyde to a hot solution containing the benzylidene-aniline and the hydrochloride of the N-lower-alkyl-amino-benzene.

14. In the reaction of formaldehyde with a para-N-lower-alkyl-amino-nitroso-benzene and an N-lower-alkyl-amino-benzene to form the corresponding benzylidene-aniline, the improvement which comprises gradually adding at least the nitroso compound and formaldehyde at a temperature below 30° C. to an aqueous solution containing the benzylidene-aniline maintained at a temperature between 60° C. and 100° C.

15. In the preparation of a benzylidene aniline from an N-lower-alkyl-amino-benzene, the improvement which comprises nitrosating an N-di-lower-alkyl-aminobenzene, adding formaldehyde to the cold reaction mass, and adding the resultant cold mixture to hot N-lower-alkyl-amino-benzene to form the corresponding benzylidene-aniline.

FREDERICK H. KRANZ.